United States Patent [19]

Levin

[11] Patent Number: 4,632,529
[45] Date of Patent: Dec. 30, 1986

[54] ACCESSORY FOR USE WITH AN OVERHEAD PROJECTOR

[76] Inventor: Wilfred Levin, 26 Doordrft Road, Constantia, 7800, South Africa

[21] Appl. No.: 712,135

[22] Filed: Mar. 15, 1985

[30] Foreign Application Priority Data

Mar. 16, 1984 [ZA] South Africa .................. 84/1983

[51] Int. Cl.[4] .............................................. G03B 21/64
[52] U.S. Cl. .............................. 353/122; 353/DIG. 5; 353/23; 33/430
[58] Field of Search ............... 353/DIG. 3, 5, 122, 353/44, 45, 22-24, 95; 33/184.5, 430, 437, 403; 434/428, 365, 215

[56] References Cited

U.S. PATENT DOCUMENTS

| | | | |
|---|---|---|---|
| 1,650,132 | 11/1927 | Jones | 33/184.5 |
| 2,039,207 | 4/1936 | Bentz . | |
| 3,093,906 | 6/1963 | Cohara | 33/430 |
| 3,222,786 | 12/1965 | Gingras | 33/437 |
| 3,267,801 | 8/1960 | Abbott et al. | 353/24 |
| 3,269,261 | 8/1966 | Porter | 353/DIG. 5 |
| 3,342,101 | 9/1967 | Zollner | 353/DIG. 5 |
| 3,536,393 | 10/1970 | Kitch . | |
| 3,542,463 | 11/1970 | Klein | 353/DIG. 5 |
| 4,203,659 | 5/1980 | Constantine et al. | 353/DIG. 5 |
| 4,254,556 | 3/1981 | Anav | 33/437 |

FOREIGN PATENT DOCUMENTS

| | | |
|---|---|---|
| 391919 | 8/1932 | United Kingdom . |
| 1231294 | 5/1971 | United Kingdom . |
| 1232181 | 5/1971 | United Kingdom . |
| 1244776 | 9/1971 | United Kingdom . |
| 1535644 | 12/1978 | United Kingdom . |

OTHER PUBLICATIONS

Staedtler Lumocolor AV Programme, 1982.
IBM Tech. Disc. Bull., Visual Projection System M. A. Rofondino, vol. 9, #12, 5/67.

*Primary Examiner*—Harry N. Haroian
*Attorney, Agent, or Firm*—Burns, Doane, Swecker & Mathis

[57] ABSTRACT

An accessory for use with an overhead projector comprises a platen which has a generally rectangular, transparent central portion and an opaque peripheral portion bounding the central portion. In the region of peripheral portion the platen has two mutually orthogonal, upstanding ridges, each extending substantially the entire length of the corresponding side of the central portion and each being defined by a pair of opposed inner and outer ridge-defining surfaces. The inner ridge-defining surfaces of the two ridges serve to locate a plurality of superimposed transparencies in register with each other and with respect to the central portion. The outer ridge-defining surfaces of the two ridges each form a guide surface for guiding a highlighting strip, or an occlusion or revelation screen.

4 Claims, 4 Drawing Figures

4,632,529

ACCESSORY FOR USE WITH AN OVERHEAD PROJECTOR

FIELD OF INVENTION

This invention relates to an accessory for use with an overhead projector (also referred to as an epidiascope).

SUMMARY OF THE INVENTION

According to the invention there is provided an accessory for use with an overhead projector, the accessory comprising a removable platen having a generally rectangular, transparent or translucent central portion and a peripheral portion bounding the central portion, the platen forming in use an upwardly facing support surface for supporting thereon two or more superimposed rectangular transparencies to be projected by light shining from the projector through said central portion and the transparencies; the platen being provided, along each of two adjacent sides of said central portion, in the region of said peripheral portion, with a locating formation which protrudes upwardly from said support surface, the locating formations being adapted and arranged to locate the transparencies in register with each other and with respect to said central portion; and at least one of the locating formations defining a rectilinear guide surface intersecting said support surface and extending substantially the entire length of the corresponding side of said central portion.

The peripheral portion is preferably opaque, thus providing a frame for the transparencies when projected and blocking off any unnecessary light around the material being projected.

The locating formations may comprise a pair of mutually orthogonal, rectilinear ridges each extending substantially the entire length of the corresponding side of said central portion, each ridge being defined by a pair of opposed inner and outer ridge-defining surfaces which intersect said support surface, the inner ridge-defining surface serving in use to locate the transparencies and the outer ridge-defining surface forming said guide surface.

The invention will now be described in more detail, by way of example, with reference to the accompanying drawings.

DETAILED DESCRIPTION OF THE PREFERRED EMBODIMENT

Figure 1:
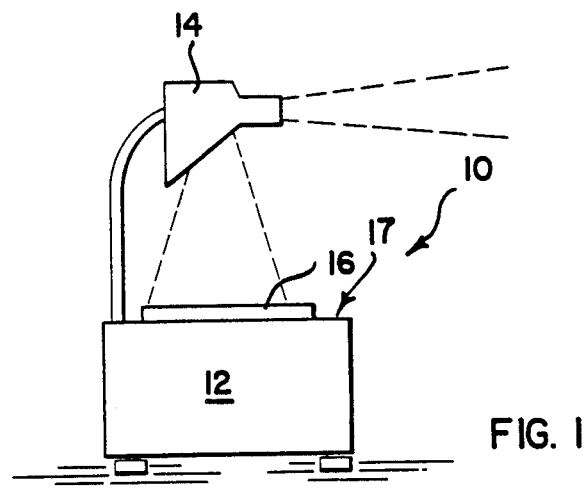
FIG. 1 is a diagrammatic side view of an overhead projector on which there is supported an accessory in accordance with the invention.

Referring first to FIG. 1, reference numeral 10 generally indicates an overhead projector having a base 12, and a reflecting and focussing arrangement 14. Within the base 12 there is provided a light source, the light source being arranged underneath a flat, transparent supporting surface 17 on which, in normal use, transparencies which are to be projected are supported. Instead of being supported directly on the transparent supporting surface, transparencies are, in the present arrangement, supported on an accessory 16, the accessory in turn being supported on the supporting surface.

Figure 2:
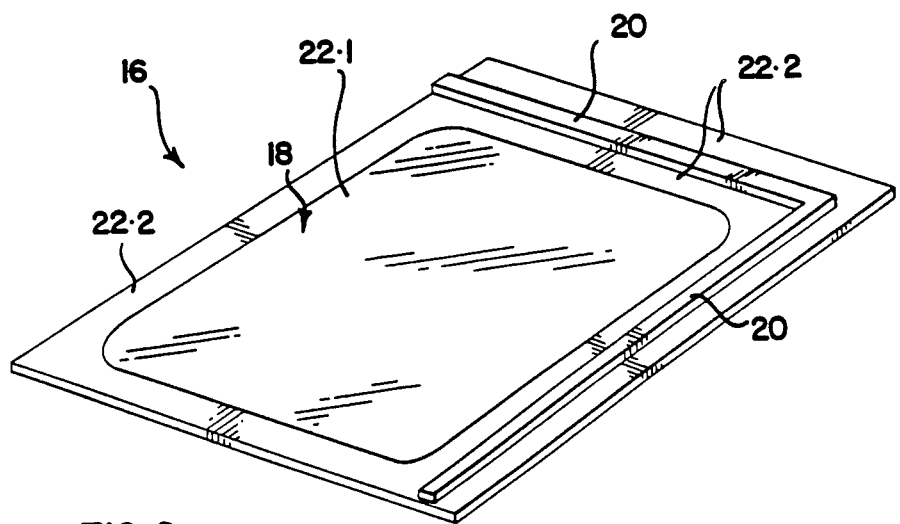
FIG. 2 is a three dimensional view of the accessory.

The accessory 16 is removable and is illustrated in more detail in FIG. 2. As will be seen in FIG. 2, it comprises a rectangular platen 18 which is provided, along each of two adjacent sides thereof, with an upstanding ridge 20, the ridges 20 being orthogonal to one another. The platen thus forms an upwardly facing support surface 21 (see FIG. 4) for supporting the transparencies thereon.

The platen is of a transparent material such as, for example, "Perspex", and is provided, around its periphery, with an opaque coating. The platen thus has a rectangular central portion 22.1 which is transparent, and, where the coating has been applied, an opaque peripheral portion 22.2 bounding the central portion. The ridges 20 lie in the region of the peripheral portion 22.2.

In use, the accessory 16 is placed on top of the supporting surface of the overhead projector 10. Transparencies can then be placed on top of the platen 18, with the material to be projected lying over the transparent central portion 22.1.

Figure 3:
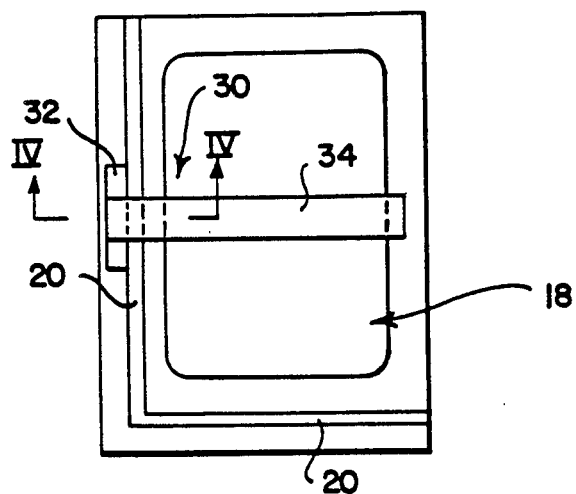
FIG. 3 is a plan view of the accessory, in use with a high-lighting strip.
Figure 4:
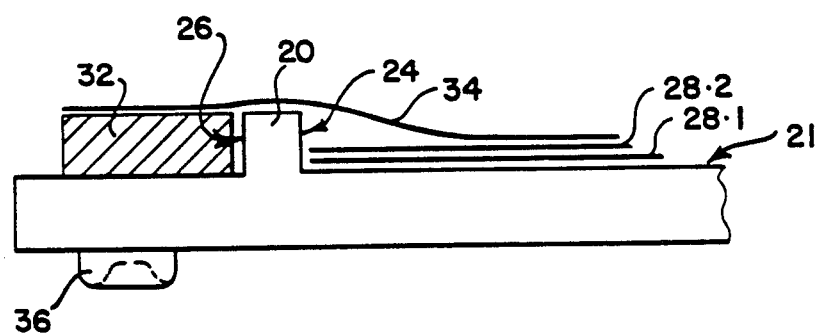
FIG. 4 is a diagrammatic cross-section of part of the accessory on line IV—IV in FIG. 3.

As will be seen in FIG. 4, each of the ridges 20 has a pair of opposed inner and outer ridge-defining surfaces 24 and 26 respectively, which intersect the support surface 21. The inner ridge-defining surfaces 24 serve in use to locate two or more superimposed rectangular transparencies (indicated in FIG. 3 by reference numerals 28.1 and 28.2) in register with each other and with respect to the central portion 22.1.

It will thus be seen that where superimposed transparencies are to be projected, and where alignment of the transparencies with respect to each other should be accurate, the accessory 16 will be of considerable assistance in aligning the transparencies.

The outer ridge-defining surfaces 26 each form a rectilinear guide surface for a cursor or high-lighting strip 30 (see FIGS. 3 and 4). The high-lighting strip comprises a block 32 whose thickness corresponds to the height of the ridges 20, and a flexible strip 34 of tinted, translucent sheet material secured to the upper face of the block. By sliding the block 32 along the guide surface 26, the high-lighting strip can be moved across the transparencies which are being projected, to highlight certain portions of the transparencies.

The high-lighting strip 30 can also conveniently be used as a T-square when preparing transparencies. In this event, the edges of the flexible strip 34 will act as guides for a marker pen and thus serve as an aid for drawing straight lines perpendicular to either one of the ridges 20. Furthermore, a lay-out grid consisting of a sheet of paper having a rectangular grid marked thereon can, as a drawing aid, be placed on the accessory underneath a transparency during preparation of the transparency. The ridges 20 will ensure that the lay-out grid remains in register with the transparency during preparation.

It is to be noted that the flexible strip 34, at least adjacent the corresponding ridge 20, is raised above the transparencies. This will assist in avoiding disturbance of the transparencies by the flexible strip as the strip is being displaced across the transparencies.

The guide surfaces 26 may also serve to guide an occlusion sheet or a revelation sheet (not illustrated). The construction of an occlusion sheet would be similar to that of the high-lighting strip 30, except that the flexible strip 34 would be opaque and need not be tinted.

The flexible strip 34, in the case of an occlusion sheet may, of course, be wider than the one illustrated in FIG. 3, if it is desired to occlude a wider band of the material which is being projected. The construction of a revelation sheet would again be similar to that of the highlighting strip 30, except that the flexible strip 34 would be translucent but not transparent (e.g. frosted) and not necessarily tinted. With the use of such a revelation sheet, the material covered by the flexible strip 34 would be perceptible to the projectionist (e.g., the lecturer) by looking at the material through the flexible strip. It would, however, not be perceptible to the audience looking at the screen onto which the transparencies are projected. As in the case of the occlusion sheet, the flexible strip 34 may be wider than illustrated in FIG. 3.

A rubber foot or bump-on 36 (see FIG. 4) may be secured to the underside of the platen 18 near each corner thereof. This will prevent the accessory from accidentally sliding on the supporting surface of the projector.

What is claimed is:

1. An accessory for use with an overhead projector, the accessory comprising a removable platen having a generally rectangular, transparent, or translucent central portion and an opaque peripheral portion bounding the central portion, the platen forming in use an upwardly facing support surface for supporting thereon two or more superimposed rectangular transparencies to be projected by light shining from the projector through said central portion and the transparencies; the platen being provided, along each of two adjacent sides of said central portion, in the region of said peripheral portion and spaced inwardly from the corresponding edge of the platen, with a locating formation which protrudes upwardly from said support surface, the locating formations being adapted and arranged to locate the transparencies in register with each other and with respect to said central portion and the upper surface of the platen on opposite sides of each of said locating formations being flat and otherwise uninterrupted by protrusions; and each one of the locating formations defining an outwardly facing rectilinear guide surface intersecting said support surface and extending substantially the entire length of the corresponding side of said central portion.

2. An accessory according to claim 1, wherein the locating formations comprise a pair of mutually orthogonal, rectilinear ridges each extending substantially the entire length of the corresponding side of said central portion, each ridge being defined by a pair of opposed inner and outer ridge-defining surfaces serving in use to locate the transparencies and the outside ridge-defining surface forming said guide surface.

3. An accessory according to claim 1, which further includes a cursor device, the cursor device comprising a block having a rectilinear edge surface which, in use, is engageable with and slidable along said guide surface, and a strip or sheet of flexible material secured to the block and in use extending from the block across said central portion.

4. An accessory according to claim 1, which further comprises a plurality of peripherally spaced feet of an elastomeric material secured to the underside of the platen, for supporting the platen in a slip-free manner on a supporting surface of the overhead projector.

* * * * *